United States Patent
Porada

(10) Patent No.: US 9,595,149 B2
(45) Date of Patent: Mar. 14, 2017

(54) ELECTRONIC KEY FOR A SECURITY SYSTEM WITH A MECHANISM FOR RELEASING A BATTERY COMPARTMENT COVER

(75) Inventor: Martin Porada, Wuppertal (DE)

(73) Assignee: HUF HULSBECK & FURST GMBH & CO. KG, Velbert (DE)

( * ) Notice: Subject to any disclaimer, the term of this patent is extended or adjusted under 35 U.S.C. 154(b) by 631 days.

(21) Appl. No.: 13/555,258

(22) Filed: Jul. 23, 2012

(65) Prior Publication Data

US 2013/0031941 A1    Feb. 7, 2013

(30) Foreign Application Priority Data

Jul. 22, 2011   (DE) .................. 10 2011 052 079

(51) Int. Cl.
*A44B 15/00* (2006.01)
*G07C 9/00* (2006.01)
(Continued)

(52) U.S. Cl.
CPC ........ *G07C 9/00944* (2013.01); *E05B 19/046* (2013.01); *H01M 2/1044* (2013.01);
(Continued)

(58) Field of Classification Search
CPC ...... G07C 2009/00952; G07C 9/00944; Y10T 70/7136; Y10T 29/49815; H01M 2/1044;
(Continued)

(56) References Cited

U.S. PATENT DOCUMENTS

2005/0223766 A1   10/2005  Hashimoto et al.
2008/0105015 A1*   5/2008  Hashimoto et al. ........ 70/456 R
(Continued)

FOREIGN PATENT DOCUMENTS

CN       2316402 Y       4/1999
CN     101270617 A       9/2008
(Continued)

OTHER PUBLICATIONS

2011 Jeep Cherokee Owners Manual. Copyright 2010.*
(Continued)

*Primary Examiner* — Suzanne Barrett
*Assistant Examiner* — Morgan McClure
(74) *Attorney, Agent, or Firm* — Cantor Colburn LLP

(57) ABSTRACT

An electronic key for a security system including an access control system and/or driving authorization control system, for a motor vehicle, with a housing within which electronics for wireless communication with the security system are disposed. The key further includes a holding compartment formed in the housing, wherein the holding compartment an energy storage device for supplying electrical energy to the electronics is located. A cover is releasably fastened on the housing and sealingly closes the holding compartment in an inserted position of the cover. The key further includes a slot formed on the housing for receiving a mechanical key. A mechanism is disposed within the slot such that the mechanism can be activated by moving the mechanical key within the slot, whereby detachment of the cover from the housing can be effected.

1 Claim, 2 Drawing Sheets

Figure 1:
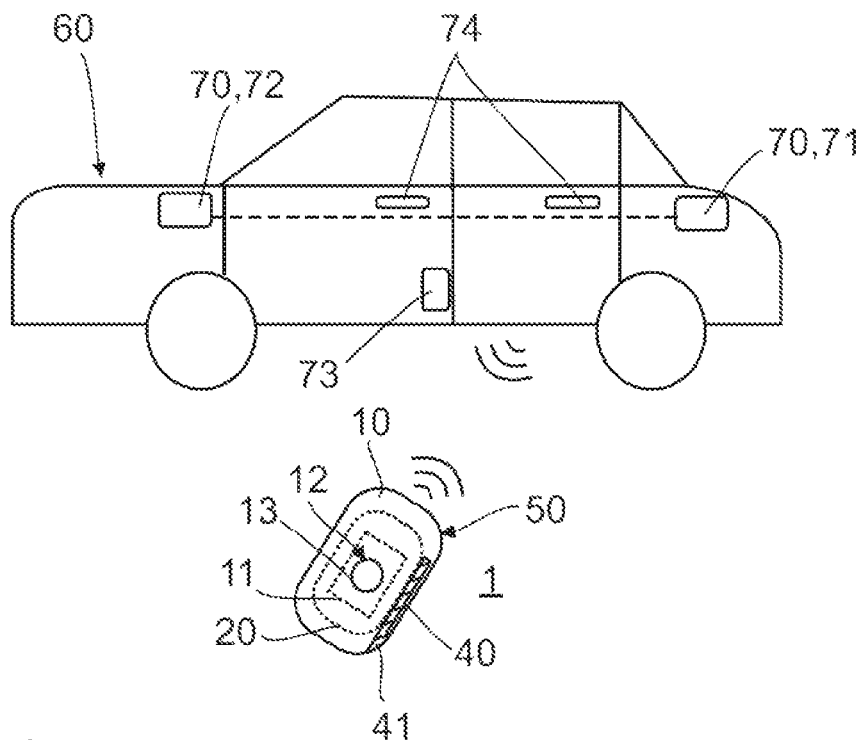

(51) Int. Cl.
    *E05B 19/04*     (2006.01)
    *H01M 2/10*     (2006.01)
    *E05B 47/00*     (2006.01)

(52) U.S. Cl.
    CPC ............ *E05B 2047/0058* (2013.01); *E05B 2047/0084* (2013.01); *G07C 2009/00952* (2013.01); *Y10T 29/49815* (2015.01); *Y10T 70/7136* (2015.04)

(58) Field of Classification Search
    CPC .......... E05B 19/046; E05B 2047/0058; E05B 2047/0084
    USPC ..... 70/252, 395, 408, 414, 429, 430, 456 R, 70/459
    See application file for complete search history.

(56) References Cited

U.S. PATENT DOCUMENTS

| | | | |
|---|---|---|---|
| 2009/0145187 A1* | 6/2009 | Deppner et al. ............. | 70/448 |
| 2009/0173613 A1 | 7/2009 | Geldmacher | |

FOREIGN PATENT DOCUMENTS

| | | | |
|---|---|---|---|
| CN | 201340618 Y | 11/2009 | |
| CN | 201570073 U | 9/2010 | |
| CN | 201671420 U | 12/2010 | |
| CN | 201671422 U | 12/2010 | |
| CN | 101998915 A | 3/2011 | |
| CN | 201756840 U | 3/2011 | |
| CN | 201835618 U | 5/2011 | |
| DE | 19605201 A1 | 8/1997 | |
| DE | 10118430 A1 | 10/2002 | |
| DE | 102005015085 A1 | 11/2005 | |
| DE | 102007017493 A1 | 10/2007 | |
| DE | 102006023143 A1 | 11/2007 | |
| DE | 102006046802 A1 | 4/2008 | |
| WO | WO 2009/124572 | * | 10/2009 |

OTHER PUBLICATIONS

Jeep Grand Cherokee Battery Replacement Guide http://www.paulstravelpictures.com/Jeep-Grand-Cherokee-Key-Fob-Battery-Replacement-Guide/Jeep-Grand-Cherokee-Key-Fob-Battery-Replacement-Guide-004.html.*

China Office Action for Chinese Patent Application No. 2012102570922; OA transmission date Aug. 21, 2015; 6 pages; non-English Translation.

China Office Action for Chinese Patent Application No. 2012102570922; OA transmission date Aug. 21, 2015; 8 pages; English Translation.

China Office Action for Chinese Patent Application No. 2012102570922; OA transmission date Mar. 1, 2016; 8 pages; English Translation.

* cited by examiner

ELECTRONIC KEY FOR A SECURITY SYSTEM WITH A MECHANISM FOR RELEASING A BATTERY COMPARTMENT COVER

The invention concerns an electronic key for a security system, which comprises in particular an access control system and/or driving authorization control system, for a motor vehicle, with a housing within which electronics for wireless communication with the security system are disposed, a holding compartment formed in the housing, where in said holding compartment an energy storage device for supplying electrical energy to the electronics is inserted, a cover which is releasably fastened on the housing and sealingly closes the holding compartment in an inserted position of the cover, and a slot formed on the housing in which a mechanical key is accommodated.

In DE 10 2006 023 143 an electronic key is disclosed which comprises a housing into which an energy storage device is inserted. Within the housing an electronics unit for data communication with a closing device of a motor vehicle is provided in addition. If the energy storage device is to be replaced, a cover fastened on the housing can be released so that the user can remove the energy storage device from the housing and can insert a new energy storage device into the housing. Thereafter the cover is fastened on the housing in order to effectively encapsulate, in particular to seal, from the outer world the electronics, including the energy storage device, which are inside the housing. It has proven itself disadvantageous that to release the cover, for example, auxiliary tools are used, whereby damage to the housing surface of the electronic key may occur.

It is the object of the present invention to provide an electronic key in which said disadvantages can be avoided, in particular an electronic key is provided which enables simple release of the battery cover without having any visible damage on the housing occur.

To achieve this object an electronic key with the features of claim 1 is proposed. In the subordinate claims preferred developments are set out.

For this purpose it is provided according to the invention that a mechanism is disposed within the slot in such a manner that by a movement of the mechanical key within the slot the mechanism can be actuated, whereby detachment of the cover from the housing can be effected. The special advantage of the invention is that the mechanism is disposed within the housing and is located in the region which is not visible to the user. By a defined movement of the mechanical key the mechanism which is not visible can be activated in order to effect the detachment of the cover from the housing. In addition, the mechanism is coordinated with the mechanical key and its movement in such a manner that without any damage the cover can be detached conveniently by the user.

A measure improving the invention provides that a seal is disposed between the cover and the housing, where in the inserted position of the cover the seal exerts on the housing a force such that after activation of the mechanism the cover is released at least partially from the housing, and in particular springs out of the housing. The seal thus represents at least one component of the mechanism which due to the force acting from the seal causes the cover to release "on its own" from the housing if the mechanism has been activated or actuated by the movement of the mechanical key. Thus the seal has two functions. First, the seal seals the inner region of the housing, in particular the holding compartment of the housing in which the energy storage device as well as, at least in part, the electronics are located. Second, the seal serves the purpose that after activation of the mechanism by the seal the cover at least partially independently releases and/or separates from the housing. The seal can on the one hand run on the cover side and/or on the other hand on the housing. For example, the seal is injected on the cover and/or on the housing so that the seal and the cover and/or the housing can form one monolithic component.

Preferably the mechanism can comprise a springy catch element which has a head area which in the inserted position of the cover is fastened in the slot. By a defined movement of the mechanical key in the slot the catch element can be moved—namely, into a position such that the fastening of the cover on the housing is undone. Thereafter the cover can be removed from the housing with an easy motion. In one possible embodiment form of the invention the head area can project at least partially into the slot in which the mechanical key is also located. By a defined movement of the mechanical key it can act with a specific force on the head area so that along with its head area the catch element can be moved from the slot and thus from a catch position. If the catch position of the catch element and its head area is left, detachment of the cover from the housing results.

Also, it can be provided that the mechanical key can be moved between an introduced position and an operational position within the slot, where in the operational position the mechanical key projects partially out of the slot, where in the operational position the mechanism can be activated to release the cover. In the introduced position the mechanical key has no function. It is held by the slot reliably within the housing of the electronic key. Only when it is necessary to have to use the mechanical key, e.g., when the vehicle electronics fail, can the mechanical key be taken completely out of the housing of the electronic key in order to mechanically activate the security system of the motor vehicle. The operational position of the mechanical key is defined in the present invention by the fact that the mechanical key does not have to be pulled completely out of the slot. This means that the operational position of the mechanical key is reached when the mechanical key projects out of the slot at least partially. This operational position is in the present invention unambiguous since at this operational position the mechanism can be activated to release the cover.

For example, it is conceivable that the housing and/or the slot for the mechanical key is embodied in such a manner that the user receives a haptic confirmation when the operational position of the key has been reached. Alternatively and/or additionally it is possible to provide on the mechanical key a marking which the user can recognize visually only if the mechanical key is pulled sufficiently far out of the housing or out of the slot of the housing. Only then has the operational position of the mechanical key been reached.

Also, it can be advantageous that the head area of the catch element is spaced from the mechanical key in the introduced position. In order to reach the operational position of the mechanical key reliably and in a fault-free manner, it is advantageous that the head area has a defined spacing from the mechanical key so that no collisions occur during movement of the mechanical key from the introduced position into its operational position.

Also, it is conceivable that the slot is embodied in such a manner that the mechanical key can be at least partially turned and/or pivoted and/or tilted within the slot, and in particular can be turned about an axis which runs along the length of the slot. The operational position can, for example, be reached via a linear and/or translational movement of the mechanical key within the slot. If the operational position of the mechanical key is reached, the mechanical key can actuate the mechanism by turning and/or pivoting and/or tilting and/or translational movement, in particular a defined force can be exerted on the catch element whereby the fastening of the catch element at the slot of the housing is released. As a consequence the cover can be reliably released from the housing.

Also, it is conceivable that the slot is formed as a channel or as a chamber, where the mechanical key can be moved linearly along the length of the slot and the slot is embodied in such a manner that the mechanical key in a defined introduced position in the slot causes activation of the mechanism. For example, it is conceivable that the mechanism for detaching the cover is activated when the key is pulled sufficiently far out of the slot. In a further embodiment form of the invention it can be provided that first of all the pulled-out position of the key must be reached, which according to the present invention is also defined as the operational position, and thereafter a defined movement, in particular turning, pivoting, translational movement, and/or tilting of the mechanical key within the slot, is necessary in order to trigger the mechanism.

Furthermore, it can be provided according to the invention that the catch element and the cover forms one monolithic component, where in the inserted position of the cover the catch element projects through an opening of the slot. Here the catch element with head area and the cover can be made of the same material. Also, it is conceivable that the catch element and the cover are formed of different materials. For example, the catch element with the cover can be a 2K injection molded part.

In a further possible embodiment of the invention the slot can comprise at least one fastening zone and one operational zone, where in the completely introduced position the mechanical key is located at least partially in the fastening zone and is held reliably within the housing. In the operational position the mechanical key is located in the operational zone of the slot. The fastening zone causes the mechanical key to be held reliably in its introduced position within the slot of the housing. So that the mechanism can be actuated reliably by the mechanical key, the catch element is located in the operational zone of the slot. In connection with this the operational zone of the slot offers the mechanical key sufficient space and/or area to actuate the catch element by a defined movement of the mechanical key in the operational zone in order to have the cover detach from the housing.

Advantageously the operational zone can comprise a base on which the head area of the catch element lies. The base can be embodied, for example, as a flat face on which the catch element lies in the inserted position of the cover. Now if by the defined movement of the mechanical key the catch element is pressed through the opening of the slot, the catch element simultaneously loses contact with the base so that the cover can detach from the housing.

In a further embodiment form improving the invention the head area can comprise a prominence which during a movement of the mechanical key is contacted in the operational zone so that the head area is moved out of the slot. Advantageously the prominence serves merely as an essential contact element for the mechanical key in order to release the catch element from the slot. The prominence advantageously projects into the slot, where in the introduced position of the mechanical key there is a spacing between the prominence and the mechanical key. Only in the operational position of the mechanical key is contacting of the prominence possible through a defined movement of the mechanical key so that effectively the cover can be released from the housing.

In order to achieve a reliable detachment of the cover from the housing it can be provided that on the base there is disposed a groove which is associated with the prominence, where in the inserted position of the cover the prominence is free of and/or without contact with the groove and on activation of the mechanism the prominence is moved through the groove. The groove serves as a guiding means in order, during detachment of the cover from the housing, to simultaneously remove the catch element with its prominence from the slot.

Advantageously the geometric configuration of the groove is adapted to the geometry of the prominence so that the prominence can move reliably through the groove, namely when the cover detaches from the housing.

Also, it can be provided that the energy storage device is fastened on the cover, where in particular through contact means on the electronics there is a connection to the energy storage device when the cover is in its inserted position. That means that there is an actual fastening of the energy storage device on the cover. If the cover is in the inserted state on the housing, the energy storage device fastened on the cover projects at least partially into the holding compartment of the housing, where there is contact with the electronics. Alternatively it is conceivable that the fastening of the energy storage device is within the holding compartment of the housing, where the cover is embodied without an energy storage device and merely serves to seal the inner region of the housing.

Advantageously the cover can comprise a vertical bar which comprises a seal whereby the inner region of the housing is sealed. Alternatively and/or additionally it is also conceivable that the housing at the opening of the slot and/or that the housing at the in-thrust opening of the slot through which the mechanical key is guided comprises a seal. Said seals can also have the same mechanical object as the previously described seal which causes an automatic release of the cover if the mechanism has been actuated. Advantageously the cover and the vertical bar form one monolithic component. The vertical bar with the seal reliably seals the inner region of the housing. Alternatively and/or additionally the seal can be disposed at the in-thrust opening of the slot so that no influencing environmental factors such as water, dirt, etc., can reach into the slot or into the inner region of the housing. In the area of the opening of the slot through which the head area of the catch element projects a disposition of the seal is also conceivable. Also here it is effectively achieved that from the area of the slot no influencing environmental factors can reach into the inner region of the housing.

In addition, the aforesaid object is achieved by a method described in the following paragraphs.

According to the invention a method for detaching a cover of an electronic key is provided, where the electric key comprises a housing within which electronics are disposed. In addition, within the housing a holding compartment is provided in which an energy storage device for supplying energy to the electronics is inserted. The cover is releasably fastened on the housing and sealingly closes the holding compartment in an inserted position of the cover. In addition, the housing is formed with a slot in which a mechanical key is accommodated. In completely pulled-out position of the mechanical key the security system is to be actuated mechanically. The mechanical key can thus be used as an emergency key. The essential steps for detaching the cover are that a first movement of the mechanical key within the slot is executed from an introduced position into an operational position, where in the operational position the mechanical key projects partially out of the slot. Thereafter in the operational position of the mechanical key a second movement is necessary in which a mechanism disposed within the slot is actuated so that on the inner side of the housing the fastening of the cover is released. Thereby a secure and well reproducible detachment process with respect to the cover is ensured which is activated on the inner side of the housing. The mechanical key, which in the completely pulled-out position serves for the mechanical actuation of the security system, can be used as an auxiliary means and/or tool in order to activate the mechanism according to the invention and on the inner side of the housing.

Advantageously the first movement can be translational and the second movement can be a movement which differs from the first movement, in particular the second movement can be a turning movement and/or a pivoting movement and/or a tilting movement and/or a translational movement. That means that the second movement can also be a combination of at least a turning movement and/or a pivoting movement and/or a tilting movement and/or a translational movement.

Further advantages, features, and details of the invention emerge from the following description in which, with reference to the drawings, possible embodiment examples of the invention are described in detail. Therein the features mentioned in the claims and in the description, each individually in itself or in any combination, can be significant for the invention.

Figure 2:
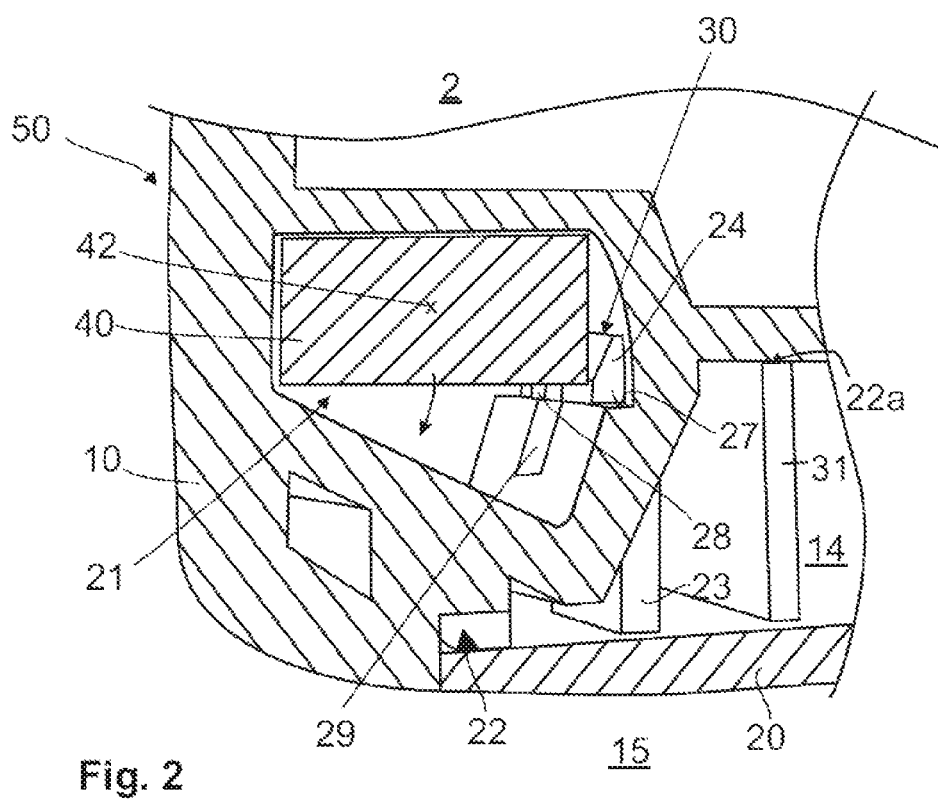
Figure 3:
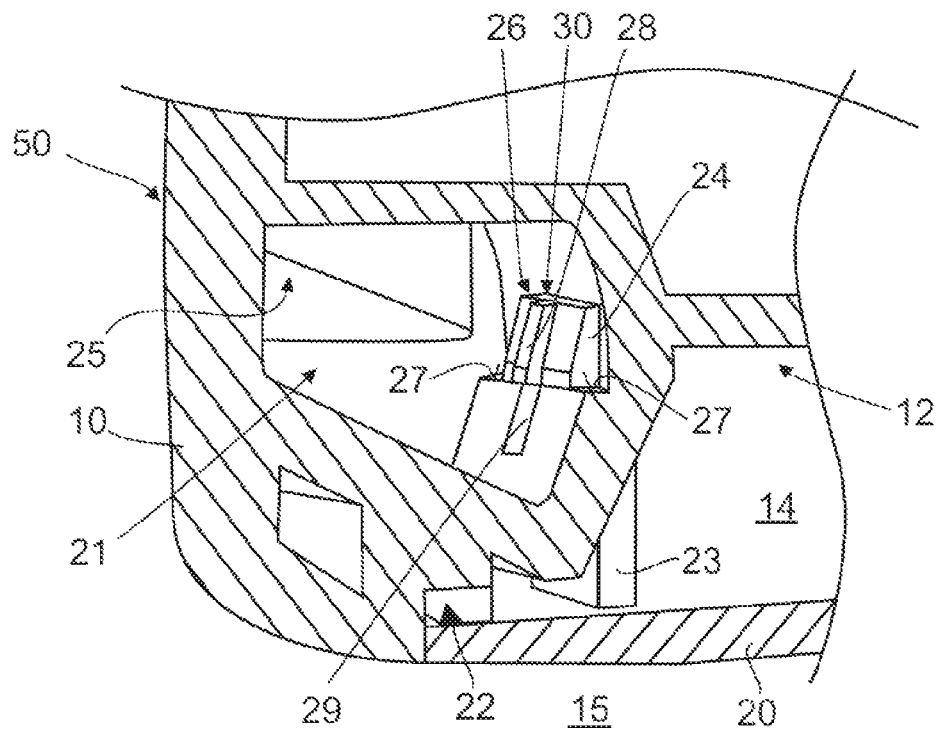
Figure 4:
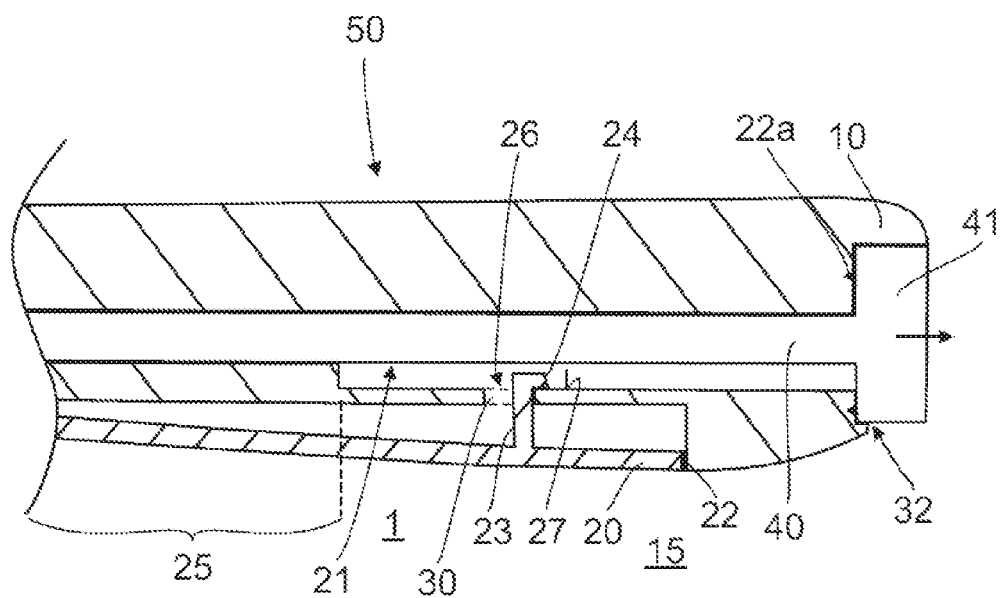

FIG. 1 shows a purely schematic view of a motor vehicle with a security system which can be brought into communication with an electronic key, FIG. 2 shows a possible embodiment form of the electronic key shown in FIG. 1, FIG. 3 shows the electronic key according to FIG. 2 in a further representation, and FIG. 4 shows a further embodiment example of an electronic key according to FIG. 1.

In FIG. 1 a motor vehicle 60 is shown which comprises a security system 70. The security system 70 according to the embodiment example represented includes an access control system 71 as well as a driving authorization control system 72. The access control system 71 is operatively connected to a lock 73 of the vehicle door and/or the trunk lid of the vehicle 60. The electronic key 50 can be a component of a keyless entry, keyless go, and/or a passive keyless entry security system 70 of the vehicle 60.

So that the user carrying with her or him the electronic key 50, which can also be called the ID transmitter, can get into the locked motor vehicle 60, there is first of all an authentication process between the electronic key 50 and the motor vehicle 60, in particular the security system 70. If the user is the authorized person, the access control system 71 activates an unlocking process of the vehicle door or the trunk lid. The lock 73 is unlocked in the following embodiment example so that the user can open the door by operating the handle 74. In the following embodiment example there is a further authentication between the electronic lock 50 and the motor vehicle 60 if the user is in the motor vehicle 60 and would like to start the engine. In connection with this the driving authorization control system 72 performs the check as to what extent the user is authorized to start the motor vehicle 60, in particular the engine. If there is a positive authentication, the steering wheel locking is cancelled so that the user can also actually maneuver the motor vehicle 60 after starting the engine.

As can be seen clearly in FIG. 1 the electronic key 50 comprises a mechanical key 40 which is located in the housing 10 of the electronic key 50. In the embodiment example represented the housing 10 is made of plastic and comprises a slot for the mechanical key 40, said slot being shown schematically in FIGS. 2 to 4.

Within the electronic key 50 there are located electronics 11 as well as a battery 13 and/or an energy storage device 13, which in a further embodiment form of the invention can also be recharged. The battery 13 is located in a holding compartment 12 of the housing 10. The holding compartment 12 is closed by a cover 20 so that the components located within the housing 10, in particular the electronics 11 and the battery 13 are protected from the influencing environmental factors prevailing outside. The fastening of the battery 13 can be implemented on the underside of the cover 20 so that on removing the cover 20 the battery 13 is simultaneously removed from the holding compartment 12. Alternatively, the battery 13 can be fastened directly in the holding compartment 12 so that on releasing the cover 20 the battery initially remains within the housing 10.

In order to release the cover 20 from the housing 10 in a convenient and reliable manner a special mechanism is provided on the inner side of the housing 10. FIGS. 2 to 4 show possible embodiment examples of the mechanism. The special feature of the mechanism is the fact that by a movement of the mechanical key 40 the mechanism can be actuated to detach the cover 20 from the housing 10. According to the embodiment examples represented, the mechanism comprises a catch element 23 which has a head area 24 which in the inserted position of the cover 20, which is shown in FIGS. 2 and 4, is fastened in the slot 21. That means that the head area 24 makes a catch connection on the slot 21.

In addition there is disposed on the housing 10 a seal 22 which effectively prevents influencing environmental factors such as dust, humidity, etc., from adversely affecting the inner working of the housing 10. Furthermore, the seal 22 in the inserted position of the cover 20 exerts on the housing 10 a force such that after activation of the mechanism, which will be discussed in the following, the cover 20 is "independently" released at least partially from the housing 10 and in particular springs out of the housing 10.

According to FIG. 1 and FIG. 4 the mechanical key 40 is in its introduced position 1. The housing 10 with the slot 21 is embodied in such a manner that the mechanical key 40, also in the embodiment examples according to FIG. 2 and FIG. 3, can be moved between its introduced position 1 and an operational position 2. The operational position 2 is shown in FIG. 2 by way of example. The operational position 2 is reached by the user pulling the mechanical key 40 at least partially out of the slot 21 so that the mechanical key 40 projects out of the housing 10 in some regions. This operational position 2 is necessary to activate the mechanism to release the cover 20. In order to release the cover 20 from the housing 10 the catch element 23 is moved by a defined movement of the mechanical key 40 specifically in such a manner that the catch connection between the catch element 23 and the slot 21 or the housing 10 is undone. If there is no longer a connection between the catch element 23 and the slot 21, the seal 22 provides that the cover 20 springs out of the housing 10 at least partially in at least some regions. The user subsequently only has to grasp or pull on the cover 20 in order to release the cover 20 from the housing 10 completely.

So that the mechanical key 40 can be brought reliably into the operational position 2 it is advantageous according to FIG. 2 as well as according to FIG. 4 if the head area 24 is spaced from the mechanical key 40.

According to FIG. 2 and FIG. 3 a first movement of the mechanical key 40 is necessary in order to carry the mechanical key 40 from the introduced position 1 into the operational position 2. In the following step when the operational position 2 is reached a second movement of the mechanical key 40 is necessary in order to activate the mechanism. In the present embodiment example according to FIG. 2 the second movement of the mechanical key 40 is defined by a turning movement in the clockwise direction about the axis 42, see the arrow. As FIGS. 2 to 4 clearly show, the slot 21 comprises a fastening zone 25 and an operational zone 26. In the completely introduced position 1 of the key 40 said key 40 is located in the fastening zone 25. In this position of the mechanical key 40 said mechanical key 40 can only be moved in one direction, namely in the direction of operational position 2. The fastening zone 25 is therefore embodied in such a manner that any pivoting and/or tilting movements of the mechanical key 40 are ruled out. Only when the operational position 2 of the mechanical key 40 is reached can the second movement of the mechanical key 40 in the operational zone 26 of the slot 21 occur. The head area 24 of the catch element 23 lies according to embodiment examples from FIG. 2 to FIG. 4 on a base 27 of the slot 21. Here the base 27 is located on the inner side of the slot 21. In addition the catch element 23 projects through an opening 30 of the slot 21. According to FIG. 2 and FIG. 3 the head area 24 has a prominence 28 which is positioned in the represented embodiment example at the center of the head area 24. By a previously described turning movement of the mechanical key 40 within the operational zone 26 of the slot 21 a corresponding force is exerted on the prominence 28 so that the head area 24 is moved away from the slot 21 or is pressed through the opening 30 into the inner region 14 of the housing 10.

If the head area 24 then loses contact with the base 27, the seal 22 provides that the cover 22 springs out of the housing 10 at least partially. This also applies for the embodiment example according to FIG. 4. In the embodiment example according to FIG. 4 it is necessary first of all in an initial movement step to pull the mechanical key 40 far enough out of the slot 21 of the housing 10 that the not explicitly represented free end of the mechanical key 40, which is on the opposite side to the handle 41 of the key 40, lies on the right side of the head area 24 of the catch element 23. Thus the operational position 2 of the mechanical key 40 is reached. In a second movement of the mechanical key 40 said key is tilted slightly in approximately the counterclockwise direction, where at the same time a translational movement in the direction of the head area 24 occurs so that effectively the catch connection of the catch element 23 by the housing 10 can be undone. In so doing, the catch element 23 is deformed elastically to the left, wherewith the contact of the head area 24 with the base 27 is lost so that through the automatic release of the cover 20 from the housing 10, triggered by the seal 22, the head area 24 is moved through the opening 30 into the outer region 15.

According to the embodiment examples from FIG. 2 to FIG. 4 the catch element 23 and the cover 20 form one monolithic component. In addition, the operational zone 26 comprises a defined chamber into which the catch element 23 projects through the opening 30 of the slot 21. So that according to FIG. 2 and FIG. 3 the head area 24 can reliably be freed from the catch connection, a groove 29 is formed on the base 27, said groove being associated with the prominence 28. In connection with this the prominence 28 is formed with an oblique surface which is directed towards the mechanical key 40. Thus the operative connection with the mechanical key 40 is improved if activation of the mechanism is required. In the inserted position of the cover 20 the prominence 28 is located free from and without contact with the groove 29. On activation of the mechanism the prominence 28 slides at least partially through this groove 29 which serves as a type of guiding aid.

FIG. 2 shows in addition that the cover 20 can be embodied on its inner side with a vertical bar 31 which is located in the inner area 14 of the housing 10. At the free end a seal 22a is located which reliably has the effect that from the outside region 15 no influencing environmental factors reach into the inner region 14 of the housing 10, the region where the sensitive electronics 11 are located. The vertical bar 31 is in the present embodiment example made of the same material as the cover 20.

According to FIG. 4 it is conceivable that in the area of the in-thrust opening 32 a seal 22a is disposed which also prevents influencing environmental factors from being able to reach into the slot 21 or the inner region 14 of the housing 10, where such entry would be disadvantageous for the electronics 11, including the energy storage device 13.

Coming back to FIG. 2 it is also conceivable that additionally and/or alternatively to the previously described seal 22a in the area of the opening 30 a corresponding seal can be disposed which prevents influencing environmental factors from the slot 21 being able to reach into the inner region 14 of the housing 10.

LIST OF REFERENCE NUMBERS

1 Introduced position
2 Operational position
10 Housing
11 Electronics
12 Holding compartment
13 Energy storage device, battery
14 Inner region
15 Outer region
20 Cover
21 Slot
22 Seal
22a Seal
23 Catch element
24 Head area
25 Fastening zone
26 Operational zone
27 Base
28 Prominence
29 Groove
30 Opening of the slot 21
31 Vertical bar
32 In-thrust opening
40 Mechanical key
41 Handle
42 Axis
50 Electronic key, ID transmitter
60 Motor vehicle
70 Security system
71 Access control system
72 Driving authorization control system
73 Lock
74 Handle

The invention claimed is:

1. Electronic key for a security system which comprises in particular an access control system and/or driving authorization control system, for a motor vehicle, with
   a housing within which electronics for wireless communication with the security system are disposed,
   a holding compartment formed in the housing, wherein inside said holding compartment an energy storage device for supplying electrical energy to the electronics is located,
   a cover which is releasably fastened on the housing and sealingly closes the holding compartment in an inserted position of the cover, and
   a slot formed on the housing, the slot having an opening through which a mechanical key is received,
   wherein
      a mechanism is disposed within the slot such that the mechanism can be activated by a movement of the mechanical key within the slot, whereby detachment of the cover from the housing can be effected,
   wherein
      in an introduced position of the mechanical key the entire length of the mechanical key extends inside the slot, and in an operational position of the mechanical key the mechanical key extends partially out of the slot,
   wherein
      the slot is configured such that in the operational position the mechanical key is at least partially able to be rotated and/or pivoted and/or tilted inside the slot; and
   wherein the mechanism comprises a springy catch element disposed within the slot, the springy catch element has a head area which extends into the slot through a recess formed at the base of the slot, the head area is releasably fastened with the base of the slot, and the head area of the springy catch element is structured to be spaced apart from the mechanical key in the introduced position, and
   wherein the recess is located in a region that is not visible through the opening of the slot,
   wherein the mechanism is structured to be activated by at least partial rotating, pivoting, or tilting of the mechanical key in the operational position of the mechanical key whereby the movement of the mechanical key acts on the head area such that along with its head area, the springy catch element is moved from the slot resulting in detachment of the cover from the housing.

* * * * *